(12) United States Patent
Zhang et al.

(10) Patent No.: US 9,111,652 B2
(45) Date of Patent: Aug. 18, 2015

(54) HIGH-TEMPERATURE GAS-COOLED REACTOR STEAM GENERATING SYSTEM AND METHOD

(75) Inventors: Zuoyi Zhang, Beijing (CN); Zongxin Wu, Beijing (CN); Dazhong Wang, Beijing (CN); Yuanhui Xu, Beijing (CN); Yuliang Sun, Beijing (CN); Fu Li, Beijing (CN); Yujie Dong, Beijing (CN)

(73) Assignee: TSINGHUA UNIVERSITY (CN)

( * ) Notice: Subject to any disclaimer, the term of this patent is extended or adjusted under 35 U.S.C. 154(b) by 258 days.

(21) Appl. No.: 13/519,109

(22) PCT Filed: Jan. 20, 2010

(86) PCT No.: PCT/CN2010/000085
§ 371 (c)(1),
(2), (4) Date: Jun. 25, 2012

(87) PCT Pub. No.: WO2011/075923
PCT Pub. Date: Jun. 30, 2011

(65) Prior Publication Data
US 2012/0269314 A1    Oct. 25, 2012

(30) Foreign Application Priority Data

Dec. 23, 2009   (CN) .......................... 2009 1 0243721

(51) Int. Cl.
*G21C 3/56*   (2006.01)
*G21D 1/00*   (2006.01)
(Continued)

(52) U.S. Cl.
CPC .. *G21D 1/00* (2013.01); *F01K 7/22* (2013.01); *F22B 1/1823* (2013.01); *G21C 1/07* (2013.01);
(Continued)

(58) Field of Classification Search
CPC .............. G21C 1/07; G21C 1/12; F01K 7/22; G21D 5/12
See application file for complete search history.

(56) References Cited

U.S. PATENT DOCUMENTS 3,312,597 A * 4/1967 Glueckauf .................... 376/411
3,398,720 A * 8/1968 Romanos ........................ 122/32
(Continued)

FOREIGN PATENT DOCUMENTS

DE   102009017130   10/2009
JP        8171000    7/1996
(Continued)

OTHER PUBLICATIONS

Zhang et al. "Design aspects of the Chinese modular high-temperature gas-cooled reactor HTR-PM" Nuclear Engineering and Design, 236 (2006), pp. 485-490.*
(Continued)

*Primary Examiner* — Jack W Keith
*Assistant Examiner* — Sharon M Davis
(74) *Attorney, Agent, or Firm* — Morriss O'Bryant Compagni, PC

(57) ABSTRACT

A high-temperature gas-cooled reactor steam generating system comprises a plurality of nuclear steam supply systems, a high-pressure cylinder (21), a low-pressure cylinder (22), a condenser (23), a condensate pump (24), a low-pressure heater (25), a deaerator (26), a water supply pump (27), and a high-pressure heater (28) which are sequentially connected end to end to form a close steam loop. On one hand, the inherent safety of the reactor is guaranteed and the generating system is simplified with the inherent safety. On the other hand, the scale economy of the steam engine system and other systems of a whole power station is guaranteed through batch copy, a shared auxiliary system and a scale effect.

16 Claims, 4 Drawing Sheets

(51) Int. Cl.
*F01K 7/22* (2006.01)
*F22B 1/18* (2006.01)
*G21C 1/07* (2006.01)
*G21C 1/12* (2006.01)
*G21C 5/02* (2006.01)
*G21D 5/12* (2006.01)

(52) U.S. Cl.
CPC .. *G21C 1/12* (2013.01); *G21C 5/02* (2013.01); *G21D 5/12* (2013.01); *Y02E 30/33* (2013.01); *Y02E 30/36* (2013.01)

(56) References Cited

U.S. PATENT DOCUMENTS

| | | | | |
|---|---|---|---|---|
| 3,724,212 A | * | 4/1973 | Bell | 376/371 |
| 3,850,794 A | * | 11/1974 | Laurer et al. | 376/269 |
| 3,935,064 A | * | 1/1976 | Yellowlees | 376/411 |
| 3,941,187 A | * | 3/1976 | Jabsen et al. | 165/157 |
| 4,007,595 A | * | 2/1977 | Braytenbah et al. | 376/211 |
| 4,175,001 A | * | 11/1979 | Haferkamp et al. | 376/394 |
| 2006/0002503 A1 | * | 1/2006 | Ougouag et al. | 376/381 |

FOREIGN PATENT DOCUMENTS

| | | |
|---|---|---|
| JP | 2001074881 | 3/2001 |
| JP | 2009204184 | 9/2009 |

OTHER PUBLICATIONS

Saltanov and Pioro (2011). World Experience in Nuclear Steam Reheat, Nuclear Power—Operation, Safety and Environement, Dr. Pavel Tsvetkov (Ed.), ISBN: 978-953-307-507-5, InTech, http://www.intechopen.com/books/nuclear-power-operation-safety-and-environment/world-experience-innuclear-steam-reheat.*

Marotta, P. Steam Reheat in Nuclear Power Plants. PhD diss., University of Tennessee, 2012. http://trace.tennessee.edu/utk_graddiss/1591.*

* cited by examiner

HIGH-TEMPERATURE GAS-COOLED REACTOR STEAM GENERATING SYSTEM AND METHOD

CROSS-REFERENCE TO RELATED APPLICATIONS

This application is a national phase entry under 35 U.S.C. §371 of PCT/CN2010/000085 filed Jan. 20, 2010, which claims priority to Chinese Patent Application No. 200910243721.4 filed Dec. 23, 2009, the entirety of each of which is incorporated by this reference.

TECHNICAL FIELD

The present invention relates to the field of nuclear power, more particularly, to a high-temperature gas-cooled reactor steam generating system and method.

BACKGROUND ART

As a clean, safe and eco-friendly energy, nuclear power is of great significance to the mitigation of energy safety and global climate change. After the setbacks of the Three Mile Island meltdown and the former Soviet Union's Chernobyl nuclear accident, people are still actively developing a safer and more economical nuclear power generation technology. Currently, the third-generation nuclear power technology has been basically mature.

In the developing fourth-generation nuclear energy system, a high-temperature gas-cooled reactor (HTGR) can achieve a high outlet temperature, high generating efficiency and high-grade heat supply capacity, which has aroused widespread concern.

HTGR adopts ceramic type coated particle fuel elements, uses helium as a coolant and graphite as a moderator. The core outlet temperature may reach 700° C. to 950° C. HTGR is a type of reactor with good safety property due to the following reasons: 1) excellent performance of the fuel elements; 2) large thermal capacity of the graphite core; 3) a full range of negative reactivity temperature coefficient; and 4) the coolant helium being a chemically stable inert gas without phase transition occurring.

The international development of HTGR began in the early 1960, three experimental reactors have been built successively in Britain, Germany and the United States, and two prototype power plants of 330 MW and 300 MW electric power were built and run in the United States and Germany respectively by the 1970s. Without taking any special measures, the maximal core temperature of an early HTGR may exceed 2000° C. under the accident condition of losing coolant, so a dedicated emergency core cooling system is required to prevent overheating damage to the fuel elements.

In order to further improve the safety of reactor, the concept of "modular" high-temperature gas-cooled reactor came into being. The modular HTGR refers specifically to the HTGR with inherent safety characteristics and relatively small single reactor power level. The basic features of such reactor are: under any accident conditions, the residual heat of the reactor core can be discharged through passive way, and the highest temperature of the core fuel would not exceed the allowable limit. Since the possibility of core melt is avoided, even if a beyond design basis accident of very low probability occurs, the radioactive dose outside the nuclear power plant still remains within the limits, the off-site emergency plan does not have to be carried out technically.

Depending on the different shapes of fuel elements, HTGR is classified into the pebble-bed reactor and prismatic reactor. For the former, the coated particle fuels together with the graphite substrate are pressed into fuel pellets of a diameter of 6 cm, to form a flowable pebble bed reactor core and implement the on-load refueling. For the latter, the coated particle fuels together with graphite are pressed into cylindrical pellets, which are then put into a hexagonal prismatic fuel assembly, to form a fixed prismatic core.

Comparing with the prismatic reactor, the pebble-bed HTGR has the following characteristics: 1) on-load handling of fuel elements, high availability rate of power plant; 2) small core excess reactivity, easy reactivity control, high neutron economy; 3) uniform and high discharge burnup, high fuel efficiency; 4) low temperature of fuel particles during normal operation, easy to further enhance the reactor outlet temperature.

As a commercial power plant for on-grid power generation, besides adequate safety, it should possess sufficient competitive economy. The limit of the modular HTGR in the economy mainly comes from safety considerations. The inherent safety of the modular HTGR requires that the decay heat can be discharged from the core by a passive way after the accident, the maximal fuel temperature is ensured to not exceed the design limits, and that the restrictions on the power density and total power of a single core are put forward technically.

How to achieve a better economy under the limit of a small single reactor power has become an issue which must be considered in the processes of design and commercial promotion of the HTGR nuclear power plant.

CONTENTS OF INVENTION

An object of the invention is to provide a HTGR steam generating system and method achieving economy while ensuring safety, to overcome the technical defects of the prior art.

To obtain the above object, a HTGR steam generating system in accordance with an embodiment of the invention is provided, which includes: a plurality of nuclear steam supply systems, a high-pressure turbine, a low-pressure turbine, a condenser, a condensate pump, a low-pressure heater, a deaerator, a water supply pump, and a high-pressure heater which are connected end to end to form a close steam loop.

Preferably, a steam reheater and an intermediate-pressure turbine are in turn connected between the high-pressure turbine and low-pressure turbine in the HTGR steam generating system.

Preferably, the outlet of the high-pressure heater is connected to a preliminary heating section of the steam reheater, and the inlet of a steam generator is connected to the preliminary heating section of the steam reheater.

Preferably, the outlet of the high-pressure turbine is connected to a reheating portion of the steam generator.

Preferably, the high-pressure turbine is connected to a reheater and the intermediate-pressure turbine respectively, the outlet of the intermediate-pressure turbine is connected to the reheater, and the reheater is connected to the low-pressure turbine.

Preferably, the nuclear steam supply system comprises a reactor and a steam generator provided separately in two pressure vessels, the reactor and the steam generator are connected by a hot gas duct, and a primary helium circulator is provided on the upper part of a shell of the steam generator.

Preferably, the reactor has a core designed as a flowable pebble bed structure, in which fuel elements are located and may flow from the top of the core toward the bottom of the core.

Preferably, the reactor has a fixed arrangement core of prismatic structure, in which fuel elements are located.

Preferably, the fuel elements adopt full ceramic type coated particle fuel elements.

Preferably, the steam generator is a once-through steam generator, using a spiral tube structure.

Preferably, the hot gas duct uses a ring structure, in which the outer ring is a cold helium flow channel for the helium flowing from the steam generator to the reactor, while the inner ring is a hot helium flow channel for the helium flowing from the reactor to the steam generator.

The present invention also provides a HTGR steam generating method, including the steps of:

S1, generating steam by means of a plurality of the nuclear steam supply systems;

S2, connecting the seam in parallel and feeding it into a high-pressure turbine and a low-pressure turbine in turn to do work, in order to drive a generator;

S3, the wet steam having done work entering a condenser for heat release, then entering a steam generator through a condensate pump, a low-pressure heater, a deaerator, a water supply pump and a high-pressure heater in turn, to complete a thermodynamic cycle;

S4, repeating the steps S1-S3.

Preferably, in step S2, after the steam being fed into the high-pressure turbine and having done work, the steam flowing out of the high-pressure turbine is sent into a steam reheater to be heated, and then successively into an intermediate-pressure turbine and the low-pressure turbine to do work.

Preferably, in step S3, wet steam having done work is sent into a preliminary heating section of a steam reheater to be heated before entering the steam generator.

Preferably, in step S2, after the steam being fed into the high-pressure turbine and having done work, the steam flowing out of the high-pressure turbine is sent into a reheating portion of the steam generator to be heated, and then successively into an intermediate-pressure turbine and the low-pressure turbine to do work.

Preferably, in step S2, after the steam being fed into the high-pressure turbine and having done work, a part of the steam flowing out of the high-pressure turbine is sent into a reheater to be heated directly, another part of the steam flowing out of the high-pressure turbine is sent into an intermediate-pressure turbine to do work and then the outlet steam is heated by the reheater, and finally the steam heated directly as well as the steam heated after doing work in the intermediate-pressure turbine is sent into the low-pressure turbine to do work.

The above technical solutions have the following advantages: taking a reactor core, a pressure vessel together with a steam generator as a standard module, thus to form the nuclear steam supply system (NSSS) module. NSSS module is copied to provide steam en masse for a large steam turbine generating system, i.e., multiple NSSS modules match a steam turbine, to achieve the configuration mode of "multiple NSSS modules driving one turbine". A relatively small-scale individual module can reduce the difficulty of manufacture, and NSSS modules reduce the cost due to batch copy. In addition, NSSS modules share some auxiliary systems which improve the utilization of the auxiliary systems, and further reduce the cost. A plurality of generator units of "multiple NSSS modules driving one turbine" can also be configured within a plant site, to further share the auxiliary facility in power plant, and to reduce the construction and operating costs. In this way, on one hand, the inherent safety of the reactor is guaranteed and the system is simplified with such inherent safety; on the other hand, the scale economy of the steam engine system and that of other systems of a whole power station is guaranteed through batch copy, a shared auxiliary system and a scale effect.

In which,
1: reactor;
2: reactor core;
3: cold helium flow channel;
4: hot helium flow channel;
5: top of the core;
6: bottom of the core;
7: high temperature and high pressure steam;
8: secondary circuit water;
9: steam generator;
10: primary helium circulator;
11: NSSS module;
12: nuclear power plant auxiliary system;
13: steam power system;
14: generator;
15: steam reheater;
21: high-pressure turbine;
22: low-pressure turbine;
23: condenser;
24: condensate pump;
25: low-pressure heater;
26: deaerator;
27: water supply pump;
28: high-pressure heater;
29: intermediate-pressure turbine;
30: reheater;
32: hot gas duct;
33: fuel elements.

SPECIFIC MODE FOR CARRYING OUT THE INVENTION

In combination with the attached drawings and examples, the specific embodiments of the present invention will be further described in details below. The following embodiments intend to illustrate the invention but not to limit the scope of the invention.

Figure 1:
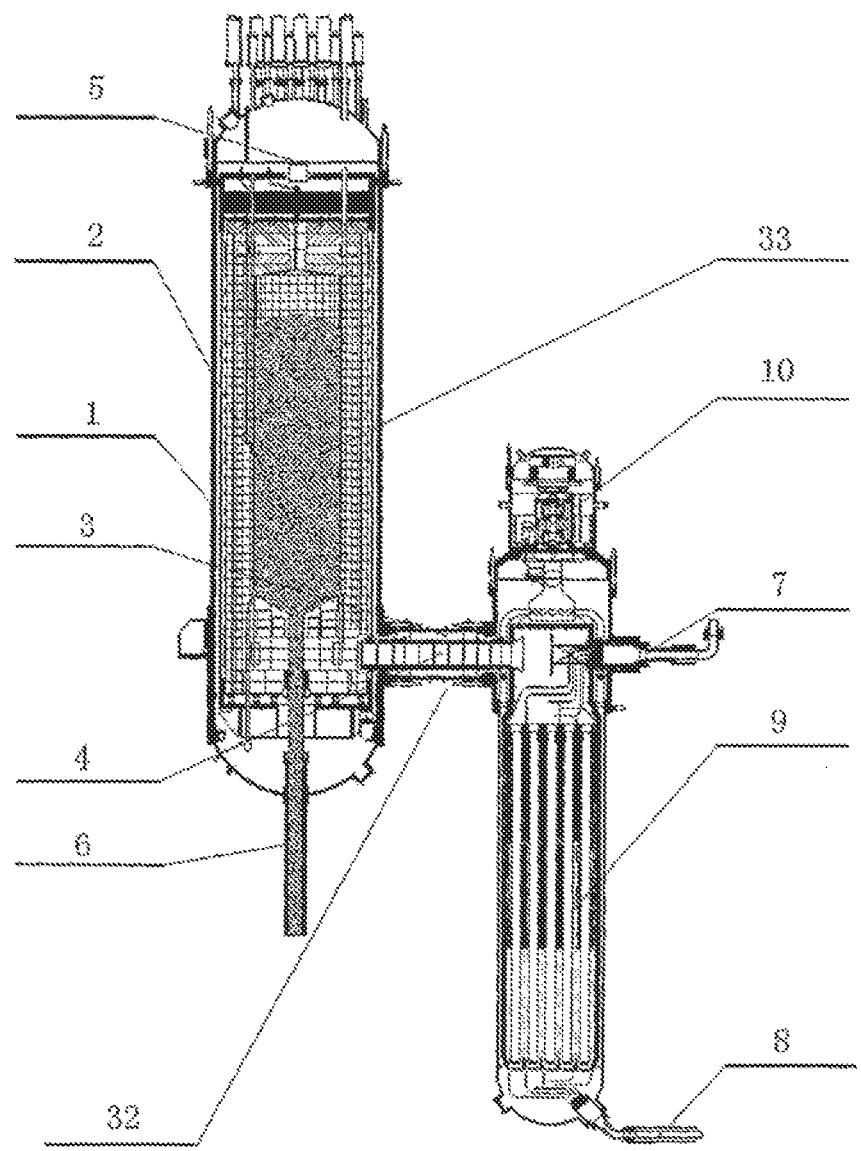
FIG. 1 is a steam generating system with a nuclear steam supply system (NSSS) module according to an embodiment of the present invention.

FIG. 1 shows a steam generating system with a nuclear steam supply system (NSSS) module of the present invention. Taking a reactor core, a pressure vessel together with a steam generator as a standard module, thus to form the nuclear steam supply system (NSSS) module. A plurality of NSSS modules 11 share nuclear power plant auxiliary systems 12 and together provide steam to a steam power system 13 to drive generator 14 to generate electricity. The nuclear power plant auxiliary systems 12 mainly include: a fuel handling and storage system, a primary circuit pressure release system, a helium purification and helium auxiliary system, a gas sampling and analysis system, a residual heat removal system, a steam generator accidental release system, a component cooling water system, a reactor building ventilation and air conditioning system, a liquid waste processing system, a solid waste processing and storage system, a nuclear island fire protection system and so on.

Figure 2:
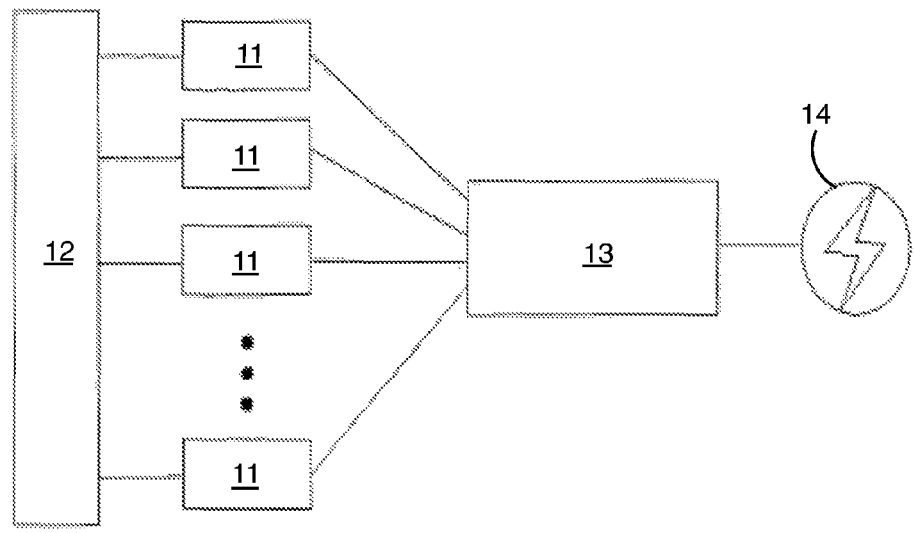
FIG. 2 is a structure schematic diagram of the nuclear steam supply system (NSSS) module according to an embodiment of the present invention.

FIG. 2 is a structure schematic diagram of the nuclear steam supply system (NSSS) module according to an embodiment of the present invention. In NSSS module 11, a reactor 1 and a steam generator 9 are disposed separately in two pressure vessels, between which a hot gas duct 32 is connected, to constitute a "side by side" arrangement. The pressure vessel of the reactor 1, the shell of the steam generator 9 and the shell of the hot gas duct 32 constitute a primary circuit pressure boundary installed in a concrete shield compartment. The hot gas duct 32 uses a ring structure, of which the inner ring is a hot helium flow channel 4, having a flow direction from the reactor 1 to the steam generator 9. The outer ring is a cold helium flow channel 3, having a flow direction from the steam generator 9 to the reactor 1. A primary helium circulator 10 is provided on the upper part of the shell of the steam generator 9. High-temperature helium gas heated in the reactor 1 heats the secondary circuit water 8 in the steam generator 9, resulting in high temperature and high pressure steam 7, which is fed to the steam power system 13. The steam generator 9 is a once-through steam generator, using a spiral tube structure.

The reactor core 2 is designed as a flowable pebble bed structure, in which the spherical fuel elements 33 flow from the top down. The reactor core 2 also may be a prismatic structure of fixed arrangement, and the fuel elements 33 are located in the core 2. Full ceramic type coated particle fuel elements 33 are adopted, being loaded from the top 5 of the core and unloaded from the bottom 6 of the core. Taking burnup measurements for the unloaded fuel elements 33 one by one, and discharging the fuel elements 33 having reached the discharge burnup out of the reactor for storage, while re-loading the fuel elements having not reached the discharge burnup into the core 2, to realize multiple recycles of fuel elements.

Figure 3:
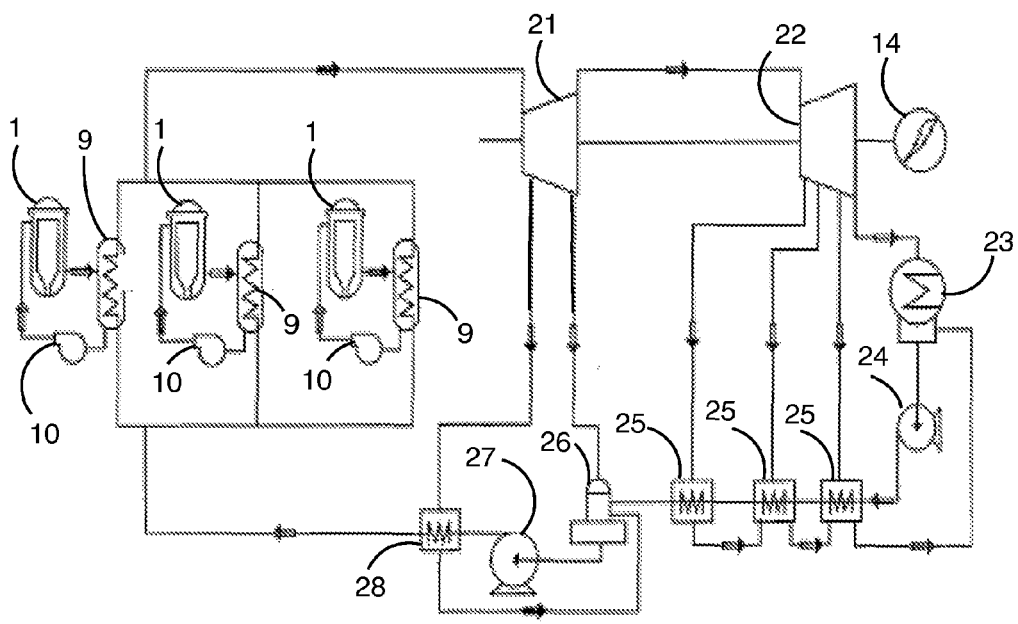
FIG. 3 is a structure schematic diagram of one embodiment of the HTGR steam generating system of the present invention.

FIG. 3 is a structure schematic diagram of one embodiment of the HTGR steam generating system of the present invention. Said system providing steam for the steam power system includes: nuclear steam supply systems, a high-pressure turbine 21, a low-pressure turbine 22, a condenser 23, a condensate pump 24, a low-pressure heater 25, a deaerator 26, a water supply pump 27 and a high-pressure heater 28 which are connected end to end to form a close steam loop, wherein the nuclear steam supply system is the above-mentioned one according to the embodiment of the invention.

This embodiment of the present invention is a cycle solution that steam directly generates electricity. Being connected in parallel, the steam generated by the plurality of NSSS modules 11 enters the high-pressure turbine 21 and the low-pressure turbine 22 in turn to do work, in order to drive the generator 14. The wet steam having done work releases heat in the condenser 23, flows through the condensate pump 24 and then the low-pressure heater 25, the deaerator 26, the water supply pump 27 as well as the high-pressure heater 28, and is sent into the steam generator 9, to complete a thermodynamic cycle.

Figure 4:
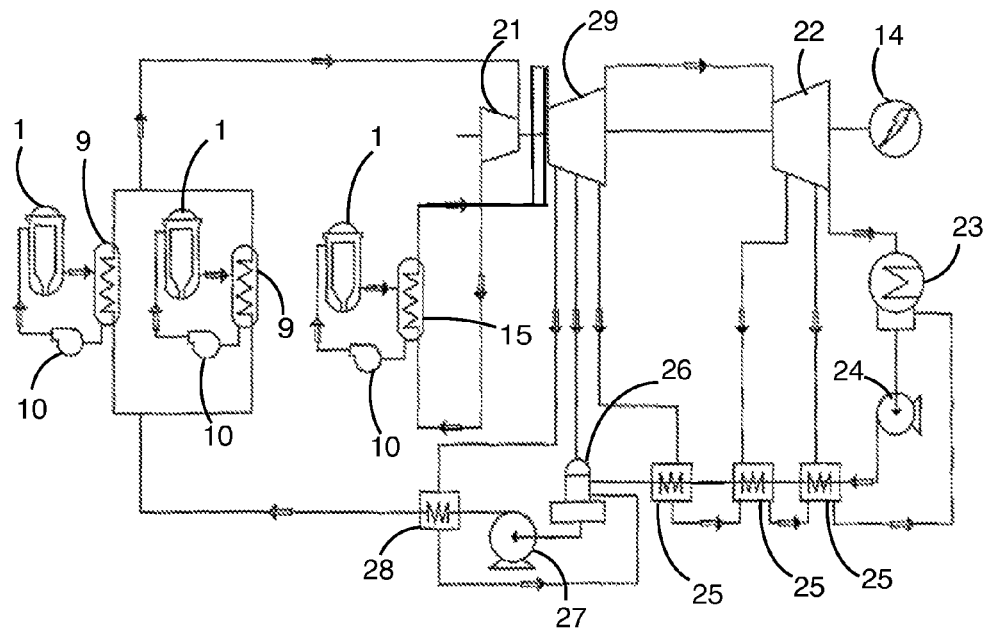
FIG. 4 is a structure schematic diagram of another embodiment of the HTGR steam generating system of the present invention.

FIG. 4 is a structure schematic diagram of another embodiment of the HTGR steam generating system of the present invention. Said system providing steam for the steam power system includes: nuclear steam supply systems, a high-pressure turbine 21, a low-pressure turbine 22, a condenser 23, a condensate pump 24, a low-pressure heater 25, a deaerator 26, a water supply pump 27 and a high-pressure heater 28 which are connected end to end to form a close steam loop, a steam reheater 15 and an intermediate-pressure turbine 29 are in turn connected between the high-pressure turbine 21 and low-pressure turbine 22, wherein the nuclear steam supply system is the above-mentioned one according to the embodiment of the invention.

This embodiment of the present invention is a cycle solution that uses reheat steam supplied by special reheat nuclear steam supply system module to generate electricity. One or more reheat nuclear steam supply system modules 11 are specially provided, equipped with the steam reheater 15 to reheat the steam. Being connected in parallel, the steam generated by the plurality of NSSS modules 11 enters the high-pressure turbine 21 firstly to do work. The steam flowing out of the high-pressure turbine 21 enters the dedicated steam reheater 15 to be heated, and then successively into the intermediate-pressure turbine 29 and the low-pressure turbine 22 to do work, in order to drive the generator 14. The wet steam having done work releases heat in the condenser 23, flows through the condensate pump 24 and then the low-pressure heater 25, the deaerator 26, the water supply pump 27 as well as the high-pressure heater 28, and is sent into the steam generator 9, to complete a thermodynamic cycle.

Figure 5:
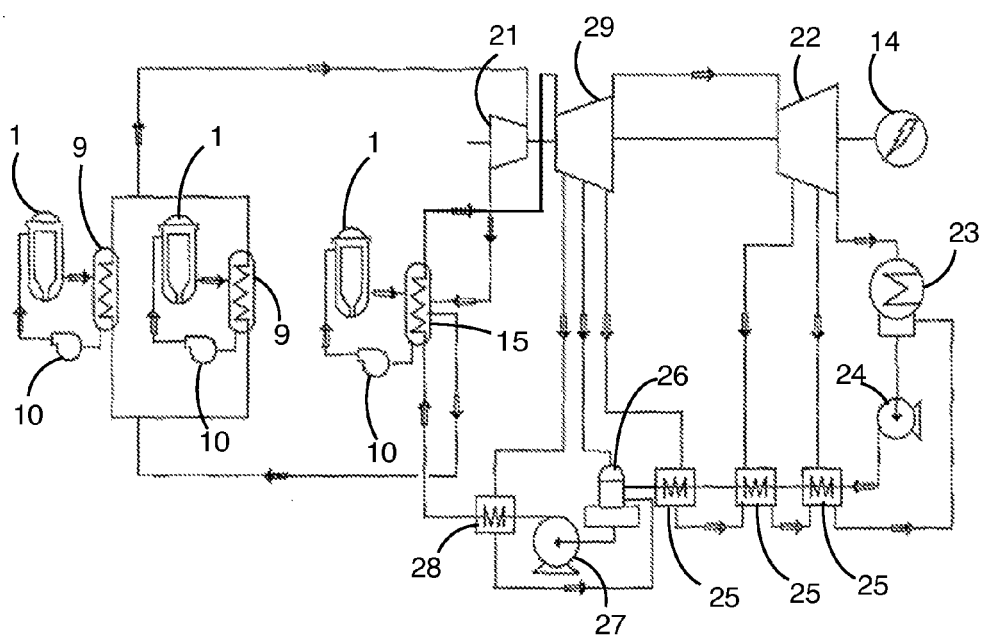
FIG. 5 is a structure schematic diagram of still another embodiment of the HTGR steam generating system of the present invention.

FIG. 5 is a structure schematic diagram of still another embodiment of the HTGR steam generating system of the present invention. Said system providing steam for the steam power system includes: nuclear steam supply systems, a high-pressure turbine 21, a low-pressure turbine 22, a condenser 23, a condensate pump 24, a low-pressure heater 25, a deaerator 26, a water supply pump 27 and a high-pressure heater 28 which are connected end to end to form a close steam loop, a steam reheater 15 and an intermediate-pressure turbine 29 are in turn connected between the high-pressure turbine 21 and low-pressure turbine 22, the outlet of the high-pressure heater 28 is connected to a preliminary heating section of the steam reheater 15, and the inlet of the steam generator 9 is connected to the preliminary heating section of the steam reheater 15, wherein the nuclear steam supply system is the above-mentioned one according to the embodiment of the invention.

This embodiment of the present invention is an improvement of the last embodiment. One or more reheat nuclear steam supply system modules 11 are specially provided, and the equipped steam reheater 15 is further used for preliminary heating of the fed water other than heating the steam. The preliminarily heated fed water enters the evaporation NSSS module 11 to be further heated. Being connected in parallel, the steam generated by the plurality of NSSS modules 11 enters the high-pressure turbine 21 firstly to do work. The steam flowing out of the high-pressure turbine 21 enters the dedicated steam reheater 15 to be heated, and then successively into the intermediate-pressure turbine 29 and the low-pressure turbine 22 to do work, in order to drive the generator 14. The wet steam having done work releases heat in the condenser 23, flows through the condensate pump 24 and then the low-pressure heater 25, the deaerator 26, the water supply pump 27 as well as the high-pressure heater 28, and is sent into the preliminary heating section of the steam reheater 15, to complete a thermodynamic cycle.

Figure 6:
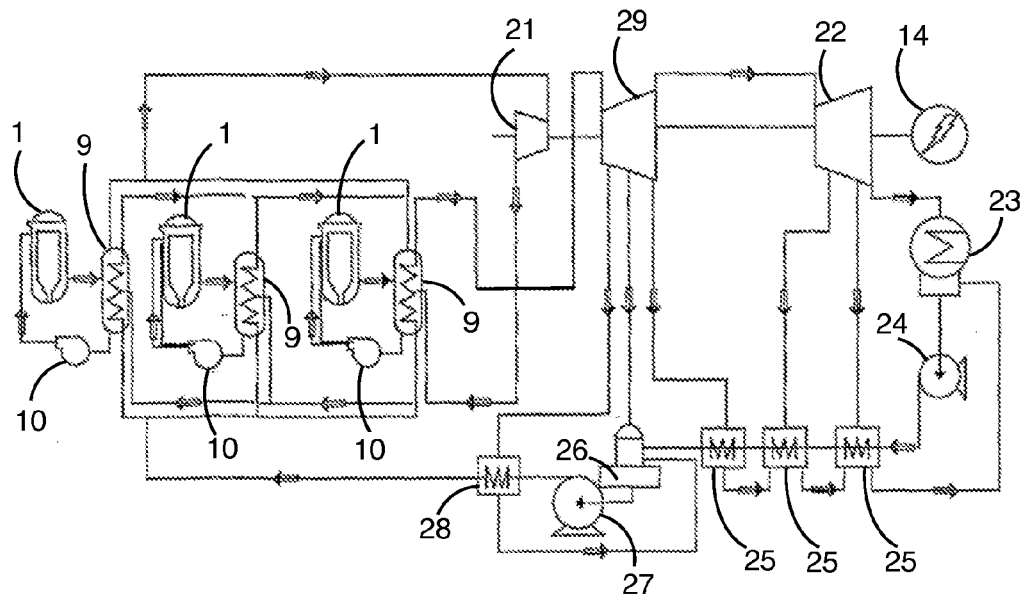
FIG. 6 is a structure schematic diagram of yet another embodiment of the HTGR steam generating system of the present invention.

FIG. 6 is a structure schematic diagram of yet another embodiment of the HTGR steam generating system of the present invention. Said system providing steam for the steam power system includes: nuclear steam supply systems, a high-pressure turbine 21, a low-pressure turbine 22, a condenser 23, a condensate pump 24, a low-pressure heater 25, a deaerator 26, a water supply pump 27 and a high-pressure heater 28 which are connected end to end to form a close steam loop, the outlet of the high-pressure turbine 21 is connected to a reheating portion of the steam generator 9, wherein the nuclear steam supply system is the above-mentioned one according to the embodiment of the invention.

This embodiment of the present invention is a cycle solution that uses reheat steam in the reactor to generate electricity. Being connected in parallel, the steam generated by the plurality of NSSS modules 11 enters the high-pressure turbine 21 firstly to do work. The steam flowing out of the high-pressure turbine 21 enters the reheating portion of the steam generator 9 again to be heated, and then successively into an intermediate-pressure turbine 29 and the low-pressure turbine 22 to do work, in order to drive the generator 14. The wet steam having done work releases heat in the condenser 23, flows through the condensate pump 24 and then the low-pressure heater 25, the deaerator 26, the water supply pump 27 as well as the high-pressure heater 28, and is sent into the steam generator 9, to complete a thermodynamic cycle.

Figure 7:
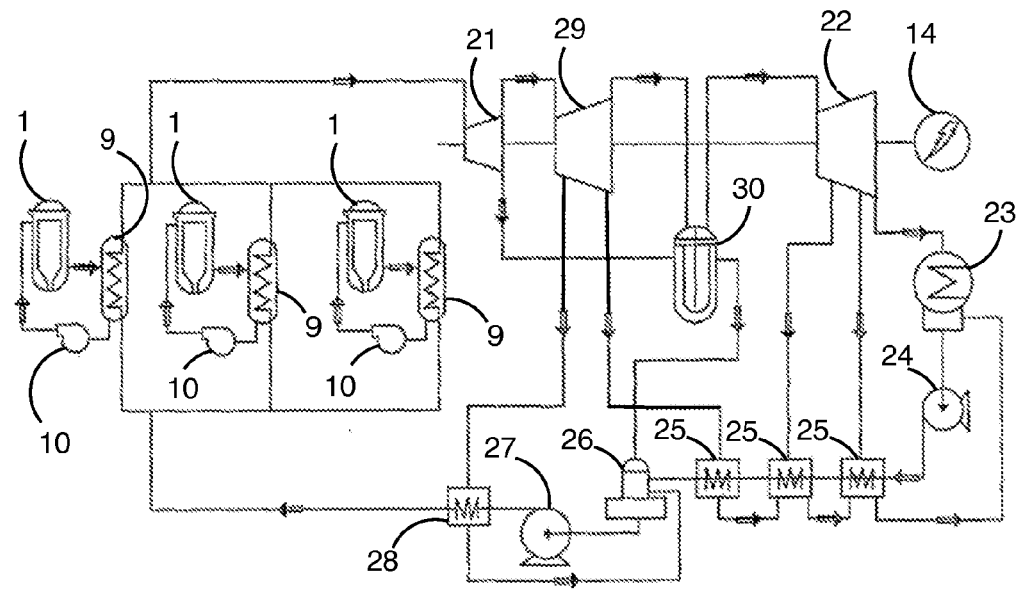
FIG. 7 is a structure schematic diagram of yet another embodiment of the HTGR steam generating system of the present invention.

FIG. 7 is a structure schematic diagram of yet another embodiment of the HTGR steam generating system of the present invention. Said system providing steam for the steam power system includes: nuclear steam supply systems, a high-pressure turbine 21, a low-pressure turbine 22, a condenser 23, a condensate pump 24, a low-pressure heater 25, a deaerator 26, a water supply pump 27 and a high-pressure heater 28 which are connected end to end to form a close steam loop, the high-pressure turbine 21 is connected to a reheater 30 and an intermediate-pressure turbine 29 respectively, the outlet of the intermediate-pressure turbine 29 is connected to the reheater 30, and the reheater 30 is connected to the low-pressure turbine 22, wherein the nuclear steam supply system is the above-mentioned one according to the embodiment of the invention. The reheater 15 is a helium-steam reheater, while the reheater 30 is a steam-steam reheater.

This embodiment of the present invention is a cycle solution that uses reheat steam out of the reactor to generate electricity. Being connected in parallel, the steam generated by the plurality of NSSS modules 11 enters the high-pressure turbine 21 firstly to do work. One part of the steam flowing out of the high-pressure turbine 21 enters the intermediate-pressure turbine 29 to do work, and the other part enters the reheater 30 to heat the outlet steam of the intermediate-pressure turbine 29. Then the heated steam enters the low-pressure turbine 22 to do work, in order to drive the generator 14. The wet steam having done work releases heat in the condenser 23, flows through the condensate pump 24 and then the low-pressure heater 25, the deaerator 26, the water supply pump 27 as well as the high-pressure heater 28, and is sent into the steam generator 9, to complete a thermodynamic cycle.

The economic advantages of the modular pebble-bed HTGR are mainly embodied in: 1) high core outlet temperature, and correspondingly high generating efficiency; 2) on-load handling of fuel elements, high availability rate of power plant; 3) it does not need an emergency core cooling system, thus the system is simplified; 4) modular manufacturing; 5) if the solution of "multiple nuclear steam supply system (NSSS) modules driving one turbine" recommended in accordance with the present invention is adopted, the scale of unit power is increased, so that the economy can be further improved.

The heat power of a single NSSS module of the modular HTGR is generally between 200-600 MW, typically corresponding to the electric power of more than hundreds of thousands kilowatts, and the electric power of the steam turbine generator units may run up to million-kilowatt level. According to the requirements of the input power of the steam turbine, several NSSS modules are connected in parallel to match one steam turbine unit, that is, using "multiple NSSS modules driving one turbine", in order to achieve a matching between the modular HTGR and high-power steam generating units. By the mode of batch copy of NSSS modules, the scale effect is realized.

Taking full advantage of the "high temperature" feature of HTGR, a supercritical steam cycle is achieved, and the generating efficiency is increased. Combination of the HTGR technology with the widely applied steam power cycle supercritical generating technology, is a supercritical cycle nuclear power plant most likely to be realized. As a high-quality "boiler", HTGR may provide a heat source higher than 900° C., which may be coupled with the supercritical steam power cycle technology to obtain the generating efficiency more than other types of reactor. Even compared with a conventional fossil-fueled power plant with the same capacity, there is no loss of tail smoke since the primary circuit of HTGR is closed, and thus HTGR has the potential to achieve higher efficiency than a supercritical thermal power plant.

The above description involves only the preferred embodiments of the present invention. It should be noted that for those skilled in the art, some improvements and modifications can be made without departing from the technology principle of the invention, which improvements and modifications should also be regarded as the protection scope of the present invention.

INDUSTRIAL APPLICABILITY

In the present invention, the nuclear steam supply system (NSSS) module is formed by taking a reactor core, a pressure vessel together with a steam generator as a standard module. NSSS module is copied to provide steam en masse for a large steam turbine generating system, that is, multiple NSSS modules match a steam turbine, to achieve the configuration mode of "multiple NSSS modules driving one turbine". A relatively small-scale individual module can reduce the difficulty of manufacture, and NSSS modules reduce the cost due to batch copy. In addition, NSSS modules share some auxiliary systems, which improves the utilization of the auxiliary systems, and further reduces the cost. A plurality of "multiple NSSS modules driving one turbine" generating units can also be configured within a plant site, to further share the auxiliary facility in power plant, and to reduce the construction and operating costs. In this way, on one hand, the inherent safety of the reactor is guaranteed and the system is simplified with such inherent safety; on the other hand, the scale economy of the steam engine system and other systems of a whole power station is guaranteed through batch copy, a shared auxiliary system and a scale effect.

The invention claimed is:

1. A high-temperature nuclear gas-cooled reactor (HTGR) steam generating system, comprising:
    a plurality of nuclear steam supply systems connected in parallel, wherein each nuclear steam supply system comprises an HTGR connected to a steam generator;
    a dedicated steam reheater comprising another HTGR separate from the plurality of nuclear steam supply systems;
    a high-pressure turbine connected to the plurality of nuclear steam supply systems;
    an intermediate-pressure turbine connected to the high-pressure turbine and the dedicated steam reheater;
    a low-pressure turbine connected to the intermediate-pressure turbine and a generator;
    a condenser connected to the low-pressure turbine;
    a condensate pump connected to the condenser;
    a low-pressure heater connected to the condenser and the condensate pump;
    a deaerator connected to the low-pressure heater and the high-pressure turbine;
    a water supply pump connected to the deaerator; and
    a high-pressure heater connected to the water supply pump, the plurality of nuclear steam supply systems reactors and corresponding steam generators and the deaerator,
    wherein the high-pressure turbine, the dedicated steam reheater, the intermediate-pressure turbine, the low-pressure turbine, the condenser, the condensate pump, the low-pressure heater, the deaerator, the water supply pump, the high-pressure heater and the plurality of nuclear steam supply systems are connected in series to form a closed steam loop.

2. The nuclear high-temperature gas-cooled reactor (HTGR) steam generating system according to claim 1, wherein the high-pressure heater is first connected to the dedicated steam reheater which is then connected to the plurality of nuclear steam supply systems.

3. The nuclear high-temperature gas-cooled reactor (HTGR) steam generating system according to claim 2, wherein an outlet of the high-pressure heater is connected to a preliminary heating section of the dedicated steam reheater, and an inlet of the plurality of nuclear steam supply systems is connected to the preliminary heating section of the dedicated steam reheater.

4. The nuclear high-temperature gas-cooled reactor (HTGR) steam generating system according to claim 1, wherein an outlet of the high-pressure turbine is connected to a reheating portion of each steam generator of each of the nuclear steam supply systems.

5. The nuclear high-temperature gas-cooled reactor (HTGR) steam generating system according to claim 1, wherein the high-pressure turbine is connected to the dedicated steam reheater and the intermediate-pressure turbine, and wherein an outlet of the intermediate-pressure turbine is connected to the dedicated steam reheater and the dedicated steam reheater is connected to the low-pressure turbine.

6. The nuclear high-temperature gas-cooled reactor (HTGR) steam generating system according to claim 1
    wherein each HTGR and steam generator of the plurality of nuclear steam supply systems are separately disposed in a pressure vessel, and further comprising a hot gas duct connected between the pressure vessel of each HTGR and steam generator of the plurality of nuclear steam supply systems and a primary helium circulator provided on an upper part of a shell of each of the corresponding steam generators.

7. The nuclear high-temperature gas-cooled reactor (HTGR) steam generating system according to claim 6, wherein the HTGR has a core designed as a pebble-bed structure, and wherein fuel elements are located in the core.

8. The nuclear high-temperature gas-cooled reactor (HTGR) steam generating system according to claim 6, wherein the HTGR has a fixed arrangement core of prismatic structure, and further comprising fuel elements located inside the core.

9. The nuclear high-temperature gas-cooled reactor (HTGR) steam generating system according to claim 7, wherein the fuel elements comprise full ceramic type coated particle fuel elements.

10. The nuclear high-temperature gas-cooled reactor (HTGR) steam generating system according to claim 6, wherein each of the plurality of steam generators comprise a once-through steam generator having a spiral tube structure.

11. The nuclear high-temperature gas-cooled reactor (HTGR) steam generating system according to claim 6,
    wherein the hot gas duct comprises a ring structure, in which an outer ring comprises a cold helium flow channel for helium flowing from the steam generator to the HTGR for each of the plurality of HTGRs corresponding steam generators, and an inner ring comprises a hot helium flow channel for helium flowing from the HTGR to the steam generator for each of the plurality of HTGRs and corresponding steam generators.

12. A method for nuclear high-temperature gas-cooled reactor (HTGR) steam generation, comprising:
    generating steam by a plurality of nuclear steam supply systems connected in parallel, wherein each nuclear steam supply system comprises: an HTGR and a steam generator;
    driving a high-pressure turbine with steam from the plurality of nuclear steam supply systems;
    utilizing a dedicated steam reheater comprising another HTGR separate from the plurality of nuclear steam supply systems;
    utilizing an intermediate-pressure turbine connected to the dedicated steam reheater and the high-pressure turbine;
    driving a low-pressure turbine connected to the high pressure intermediate-pressure turbine;
    utilizing a condenser connected to the low-pressure turbine;
    utilizing a condensate pump connected to the condenser;
    utilizing a low-pressure heater connected to the condenser and the condensate pump;
    utilizing a deaerator connected to the low-pressure heater;
    utilizing a water supply pump connected to the deaerator; and
    utilizing a high-pressure heater connected to the water supply pump, the plurality of nuclear steam supply systems and the deaerator,
    wherein the high-pressure turbine, the dedicated steam reheater, the intermediate-pressure turbine, the low-pressure turbine, the condenser, the condensate pump, the low-pressure heater, the deaerator, the water supply pump, the high-pressure heater and each of the plurality of nuclear steam supply systems are connected to form a closed steam loop;
    driving a generator with the low-pressure turbine; and
    feeding steam from the low-pressure turbine to the condenser for heat release, then to the low-pressure heater, the deaerator, the water supply pump and the high-pressure heater, to complete a thermodynamic cycle.

13. The method according to claim 12, further comprising feeding steam flowing out of the high-pressure turbine to the dedicated steam reheater to reheat the steam, and then feeding the steam to the intermediate-pressure turbine and the low-pressure turbine.

14. The method according to claim 13, further comprising feeding wet steam from the low-pressure turbine to a preliminary section of the dedicated steam reheater.

15. The method according to claim 12, further comprising feeding the steam flowing out of the high-pressure turbine to a reheating portion of dedicated steam reheater to reheat the steam.

16. The method according to claim 12, further comprising feeding a part of the steam flowing out of the high-pressure turbine to the dedicated steam reheater to directly heat the steam, and feeding another part of the steam flowing out of the high-pressure turbine to the intermediate-pressure turbine, the steam exiting the intermediate-pressure turbine being heated by the dedicated steam reheater, with the steam heated directly as well as the steam is fed into the low-pressure turbine.

* * * * *